United States Patent
Hsu et al.

(10) Patent No.: US 8,745,524 B2
(45) Date of Patent: Jun. 3, 2014

(54) DISPLAY METHOD AND DEVICE THEREOF

(75) Inventors: Hung-Young Hsu, Taipei Hsien (TW);
Pei-Ling Lai, Taipei Hsien (TW);
Chia-Hsien Li, Taipei Hsien (TW);
Li-Hsuan Chen, Taipei Hsien (TW)

(73) Assignee: Wistron Corp., Hsichih, Taipei Hsien (TW)

(*) Notice: Subject to any disclaimer, the term of this patent is extended or adjusted under 35 U.S.C. 154(b) by 1189 days.

(21) Appl. No.: 12/267,901

(22) Filed: Nov. 10, 2008

(65) Prior Publication Data
US 2009/0271734 A1 Oct. 29, 2009

(30) Foreign Application Priority Data
Apr. 25, 2008 (TW) ................ 97115331 A

(51) Int. Cl.
*G06F 3/00* (2006.01)

(52) U.S. Cl.
USPC .......... 715/786; 715/701; 715/865; 382/103; 382/117; 382/118

(58) Field of Classification Search
USPC .......... 715/786, 865, 701; 382/117, 118, 103
See application file for complete search history.

(56) References Cited

U.S. PATENT DOCUMENTS

| | | | | |
|---|---|---|---|---|
| 3,683,359 A * | 8/1972 | Kleinschnitz | ................ | 345/471 |
| 4,836,670 A * | 6/1989 | Hutchinson | ................ | 351/210 |
| 5,345,281 A * | 9/1994 | Taboada et al. | ................ | 351/210 |
| 5,495,566 A * | 2/1996 | Kwatinetz | ................ | 715/785 |
| 5,850,211 A * | 12/1998 | Tognazzini | ................ | 345/158 |
| 6,067,069 A * | 5/2000 | Krause | ................ | 345/685 |
| 7,429,108 B2 * | 9/2008 | Rosenberg | ................ | 351/209 |
| 7,681,123 B2 * | 3/2010 | Krause | ................ | 715/256 |
| 2002/0105482 A1 | 8/2002 | Lemelson et al. | | |
| 2002/0180799 A1 * | 12/2002 | Peck et al. | ................ | 345/784 |
| 2003/0020755 A1 * | 1/2003 | Lemelson et al. | ................ | 345/786 |
| 2006/0256083 A1 * | 11/2006 | Rosenberg | ................ | 345/156 |
| 2009/0125849 A1 * | 5/2009 | Bouvin et al. | ................ | 715/863 |

FOREIGN PATENT DOCUMENTS

CN 1694045 A 11/2005

OTHER PUBLICATIONS

Kumar et al, Gaze-enhanced Scrolling Techniques, 2007, pp. 1-4.*

* cited by examiner

*Primary Examiner* — Ryan Pitaro
(74) *Attorney, Agent, or Firm* — Muncy, Geissler, Olds & Lowe, P.C.

(57) ABSTRACT

A display method is disclosed. The display method includes the following steps. Capture a facial feature of a user to obtain an image. Process the image to obtain a viewing angle of the user. Scroll page content displayed by a display element according to the viewing angle of the user. A display device is also disclosed.

10 Claims, 15 Drawing Sheets

DISPLAY METHOD AND DEVICE THEREOF

RELATED APPLICATIONS

This application claims priority to Taiwan Application Serial Number 97115331, filed Apr. 25, 2008, which is herein incorporated by reference.

BACKGROUND

1. Field of Invention

The present invention relates to a display method and device thereof. More particularly, the present invention relates to a display method and device thereof for operating page content displayed on a display element.

2. Description of Related Art

Since the displaying size of web content is often larger than display range of a display element, it is necessary for users to operate the web content on the display element, such as scroll forwards or scroll backwards the web content, to browse the whole web content. Content of digital documents is often more than a page. Therefore, some more operations, like page up or page down, are needed for users to read the whole digital document. Generally, users perform such page content operations using the mouse or the keyboard. However, performing such page content operations with a mouse or a keyboard repeatedly can be annoying.

Above all, a display method and device thereof for operating page content displayed on a display element without the keyboard or the mouse is needed.

SUMMARY

According to one embodiment of this invention, a display method includes the following steps:

(a) Capturing a facial feature of a user to obtain an image.

(b) Processing the image to obtain a viewing angle of the user.

(c) Scrolling page content displayed by a display element according to the viewing angle of the user.

According to another embodiment of this invention, a display device includes a display element, a camera, an image-processing element and a page-content-scrolling element. The display element displays page content. The camera captures a facial feature of a user to obtain an image. The image-processing element processes the image to obtain a viewing angle of the user. The page-content-scrolling element scrolls the page content according to the viewing angle of the user.

According to still another embodiment of this invention, a display method includes the following steps:

(a) Capturing a facial feature of a user at time intervals to obtain plural images.

(b) Processing the images to obtain a head motion of the user.

(c) Operating the page content according to the head motion.

According to yet another embodiment of this invention, a display device includes a display element, a camera, a motion-processing element and a page-content-operating element. The display element displays page content. The camera captures a facial feature of a user at time intervals to obtain plural images. The motion-processing element processes the images to obtain a head motion of the user. The page-content-operating element operates the page content according to the head motion.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
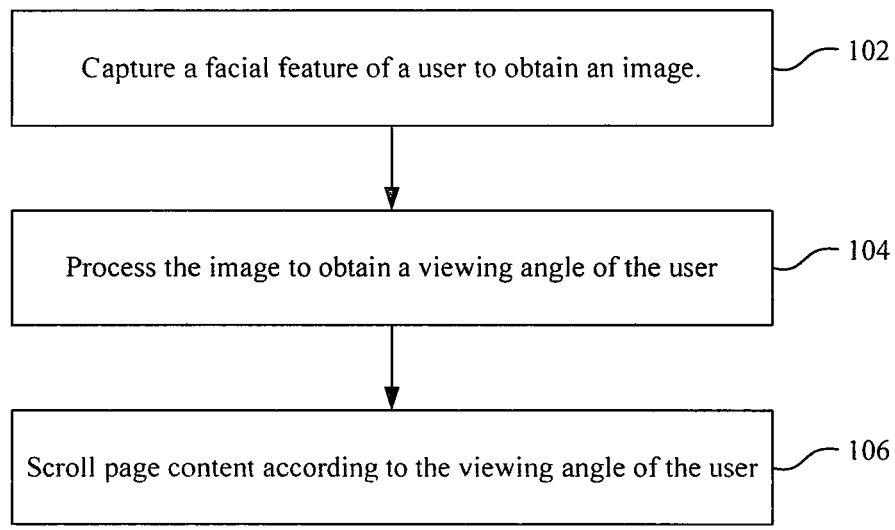
FIG. 1 is a flowchart of a display method 100 according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a flowchart of a display method 100 according to one embodiment of this invention. The display method 100 operates page content displayed by a display element according to a viewing angle of a user. The display method 100 includes the following steps:

(a) Capture a facial feature of a user to obtain an image (step 102).

(b) Process the image to obtain a viewing angle of the user (step 104).

(c) Scroll page content displayed by a display element according to the viewing angle of the user (step 106).

Figure 2A:
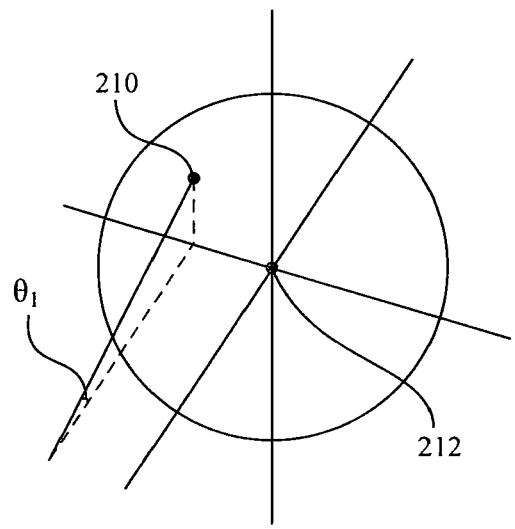
FIG. 2A and FIG. 2B illustrate an eyeball image of the user respectively.
Figure 2B:
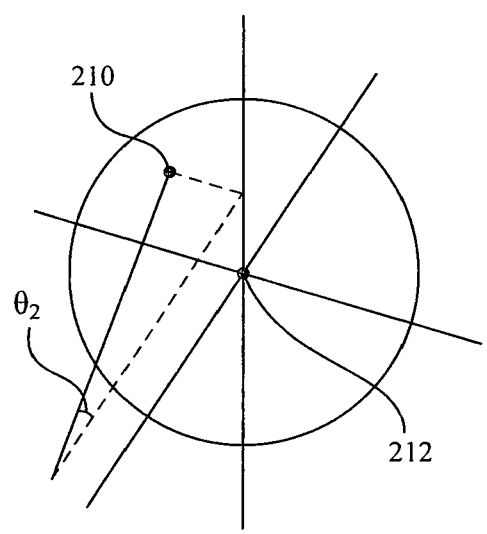

The facial feature of the user may be the pupil, the head, the nose, the mouth or any other facial feature of the user. For example, capture the eyeball of a user to obtain an eyeball image (step 102). Process the eyeball image to obtain a viewing angle of the user (step 104), wherein the viewing angle of the user may include a vertical viewing angle $\theta_1$ of the user and a horizontal viewing angle $\theta_2$ of the user. FIG. 2A and FIG. 2B illustrate an eyeball image of the user respectively. Referring to FIG. 2A, the vertical viewing angle $\theta_1$ of the user is the angle between a pupil position 210 of the user and the horizontal plane through the eyeball center 212 of the user. Referring to FIG. 2B, the horizontal angle $\theta_2$ of the user is the angle between the pupil position 210 of the user and the vertical plane through the eyeball center 212 of the user. Scroll page content displayed by a display element according to the vertical viewing angle $\theta_1$ of the user and the horizontal viewing angle $\theta_2$ of the user (step 106). Therefore, the page content displayed by the display element can be scrolled according to the viewing angle of the user.

Figure 3:
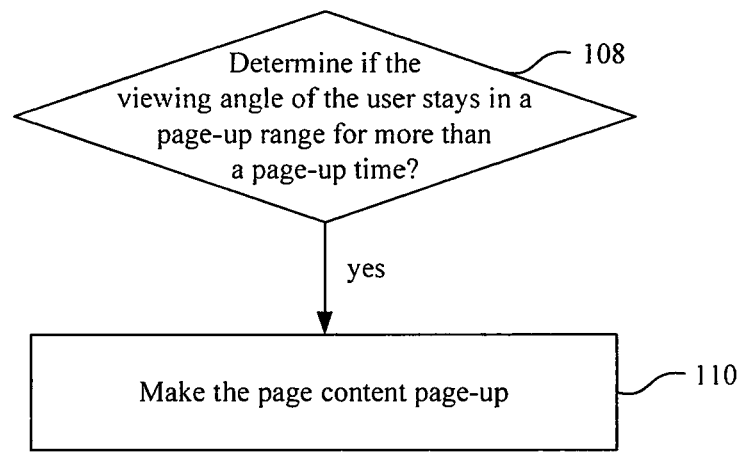
FIG. 3 is a flowchart of scrolling the page content according to the viewing angle of the user.

There are many different ways to scroll the page content according to the viewing angle of the user (step 106). FIG. 3 is a flowchart of scrolling the page content according to the viewing angle of the user. Referring to FIG. 3, scrolling the page content according to the viewing angle of the user may include the following steps:

(d) Determine if the viewing angle of the user stays in a page-up range for more than a page-up time (step 108).

(e) Make the page content page-up if the viewing angle of the user stays in the page-up range for more than the page-up time (step 110).

Figure 4:
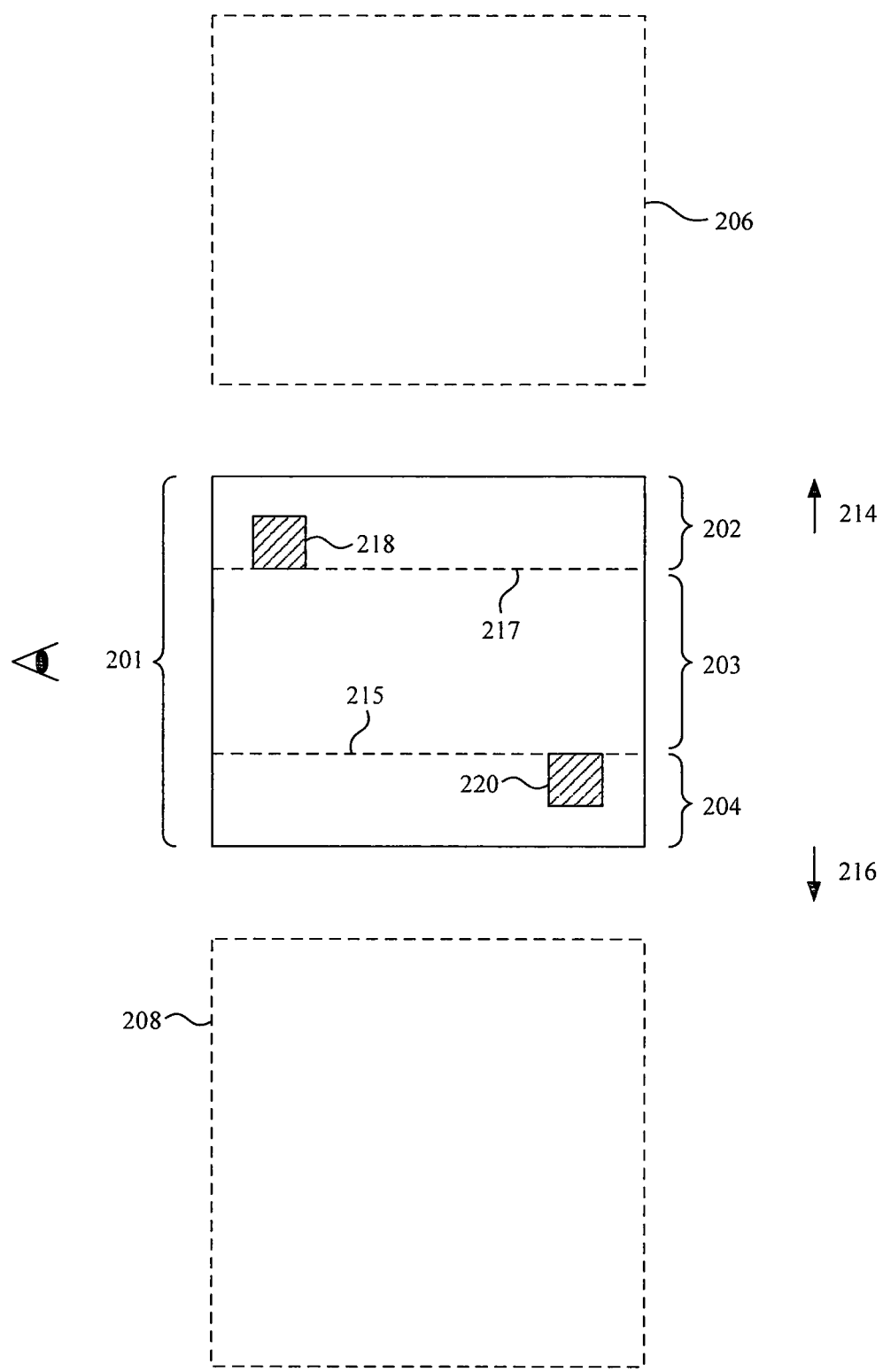
FIG. 4 illustrates page content 201 displayed on a display element.

The sight of the user may fall on a page-up region of the page content when the viewing angle of the user stays in the page-up range. For example, FIG. 4 illustrates a page content 201 displayed on a display element, wherein words on the page content 201 are horizontal. Referring to FIG. 3 and FIG. 4, determine if the viewing angle of the user stays in a page-up range for more 20 than a page-up time (step 108), wherein the sight of the user may fall on a page-up region 218 of the page content 201 when the viewing angle of the user stays in the page-up range. In other words, determine if the sight of the user falls on the page-up region 218 for more than the page-up time. Then, make the page content 201 page-up if the viewing angle of the user stays in the page-up range for more than the page-up time (step 110). In other words, replace the page content 201 with a previous page content 206 if the sight of the user falls on the page-up region 218 for more than the page-up time, wherein the previous page content 206 is virtually above the page content 201 and is not displayed on the display element. However, this embodiment can also be applied for a vertical-text page content with some amendments. Therefore, the display method can make the page content page-up according to the viewing angle of the user.

Figure 5:
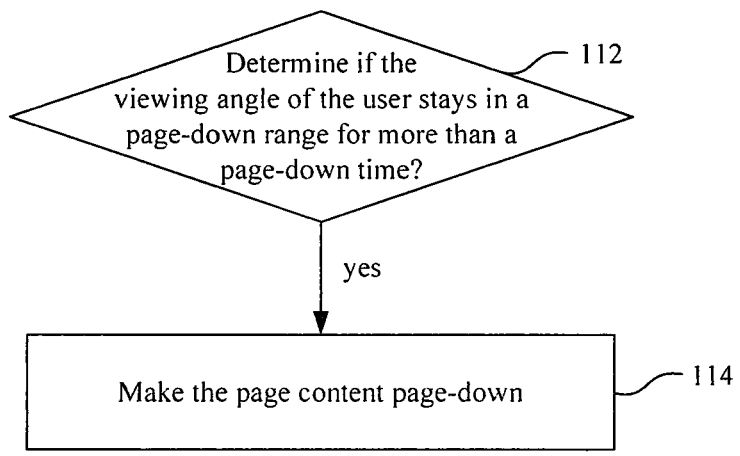
FIG. 5 is another flowchart of scrolling the page content according to the viewing angle of the user.

FIG. 5 is another flow diagram of scrolling the page content according to the viewing angle of the user. Referring to FIG. 5, scrolling the page content according to the viewing angle of the user may include the following steps:

(f) Determine if the viewing angle of the user stays in a page-down range for more than a page-down time (step 112).

(g) Make the page content page-down if the viewing angle of the user stays in the page-down range for more than the page-down time (step 114).

The sight of the user may fall on a page-down region of the page content when the viewing angle of the user stays in the page-down range. Referring to FIG. 4 and FIG. 5. For example, determine if the viewing angle of the user stays in the page-down range for more than the page-down time (step 112), wherein the sight of the user may fall on a page-down region 220 of the page content 201 when the viewing angle of the user stays in the page-down range. In other words, determine if the sight of the user falls on the page-down region 220 for more than the page-down time. Then, make the page content 201 page-down if the viewing angle of the user stays in the page-down range for more than the page-down time (step 114). In other words, replace the page content 201 with next page content 208 if the sight of the user falls on the page-down region 220 for more than the page-down time, wherein page content of the next page content 208 is virtually below the page content 201 and is not displayed on the display element. However, this embodiment can also be applied for vertical-text page content with some amendments. Therefore, the display method can make the page content page-down according to the viewing angle of the user.

Figure 6:
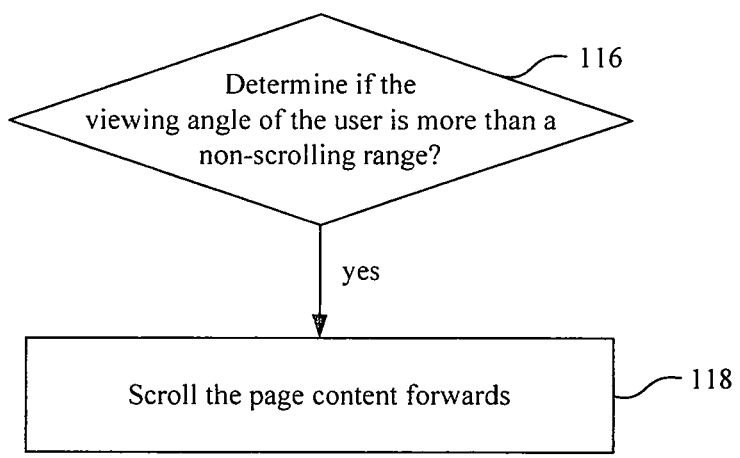
FIG. 6 is still another flowchart of scrolling the page content according to the viewing angle of the user.

FIG. 6 is still another flow diagram of scrolling the page content according to the viewing angle of the user. Referring to FIG. 6, scrolling the page content according to the viewing angle of the user may include the following steps:

(h) Determine if the viewing angle of the user is more than a non-scrolling range (step 116).

(i) Scroll the page content forwards if the viewing angle of the user is more than the non-scrolling range (step 118).

Figure 7:
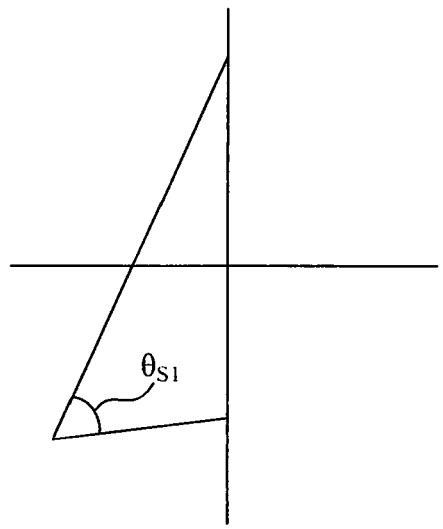
FIG. 7 illustrates a non-scrolling range when words on page content are horizontal.
Figure 8:
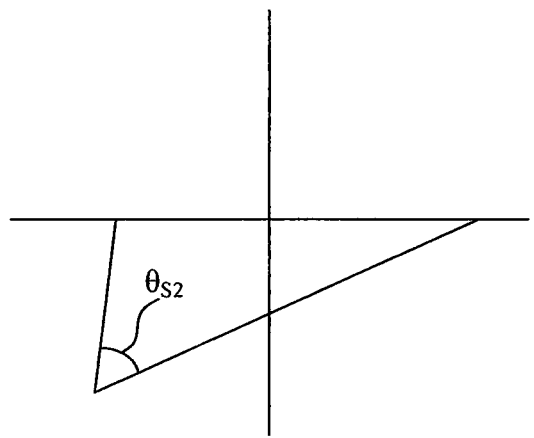
FIG. 8 illustrates another non-scrolling range when words on page content are vertical.

The sight of the user may fall on a non-operation region of the page content when the viewing angle of the user is in the non-scrolling range. FIG. 7 illustrates a non-scrolling range when words on page content are horizontal. The viewing angle of the user is more than the non-scrolling range when the vertical viewing angle is above the non-scrolling range $\theta_{S1}$. Whereas the viewing angle of the user is less than the non-scrolling range when the vertical viewing angle is below the non-scrolling range $\theta_{S1}$. FIG. 8 illustrates another non-scrolling range when words on page content are vertical. When the line sequence of the page content is from right side to left side, the viewing angle of the user is more than the non-scrolling range $\theta_{S2}$ as the sight of the user falls at the right side of the non-scrolling range $\theta_{S2}$. Whereas the viewing angle of the user is less than the non-scrolling range $\theta_{S2}$ as the sight of the user falls on the left side of the non-scrolling range $\theta_{S2}$. However, when the line sequence of the page content is from left side to right side, the viewing angle of the user is more than the non-scrolling range $\theta_{S2}$ as the sight of the user falls on the left side of the non-scrolling range $\theta_{S2}$. Whereas the viewing angle of the user is less than the non-scrolling range $\theta_{S2}$ as the sight of the user falls at the right side of the non-scrolling range $\theta_{S2}$.

Furthermore, refer to FIG. 4 and FIG. 6. For example, determine if the viewing angle of the user is more than the non-scrolling range (step 116), wherein the sight of the user may fall above an upper line 217 of a non-operation region 203 of the page content 201 when the viewing angle of the user is more than the non-scrolling range. In other words, determine if the sight of the user falls above the upper line 217. Scroll the page content 201 forwards (in the direction 214) if the viewing angle of the user is more than the non-scrolling range (step 118). In other words, scroll the page content 201 forwards (in the direction 214) once the sight of the user falls above the upper line 217. However, this embodiment can also be applied for a vertical-text page content with some amendments. Therefore, the display method can scroll the page content forwards according to the viewing angle of the user.

Figure 9:
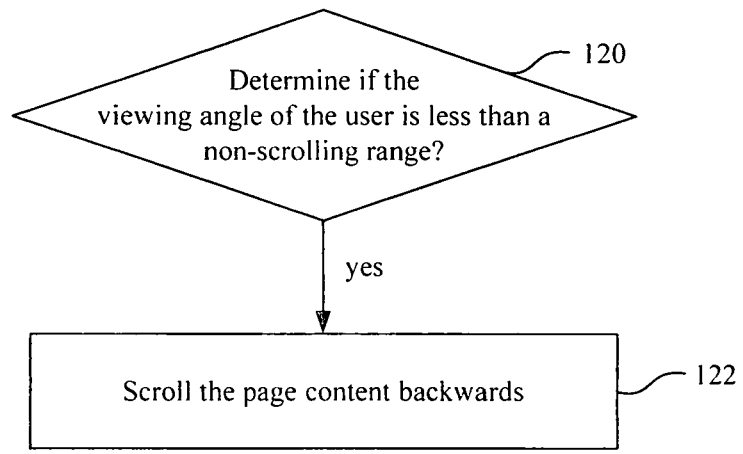
FIG. 9 is yet another flowchart of scrolling the page content according to the viewing angle of the user.

FIG. 9 is yet another flowchart of scrolling the page content according to the viewing angle of the user. Referring to FIG. 9, scrolling the page content according to the viewing angle of the user may include the following steps:

(j) Determine if the viewing angle of the user is less than a non-scrolling range (step 120).

(k) Scroll the page content backwards if the viewing angle of the user is less than the non-scrolling range (step 122).

For example, referring to FIG. 4 and FIG. 9. Determine if the viewing angle of the user is less than the non-scrolling range (step 120), wherein the sight of the user may fall below a lower line 215 of the non-operation region 203 of the page content 201 when the viewing angle of the user is less than the non-scrolling range. In other words, determine if the sight of the user falls below the lower line 215. Scroll the page content 201 backwards (in the direction 216) if the viewing angle of the user is less than the non-scrolling range (step 122). In other words, scroll the page content 201 backwards (in the direction 216) once the sight of the user falls below the lower line 215. However, this embodiment can also be applied for a vertical-text page content with some amendments. Therefore, the display method can scroll backwards the page content according to the viewing angle of the user.

Figure 10:
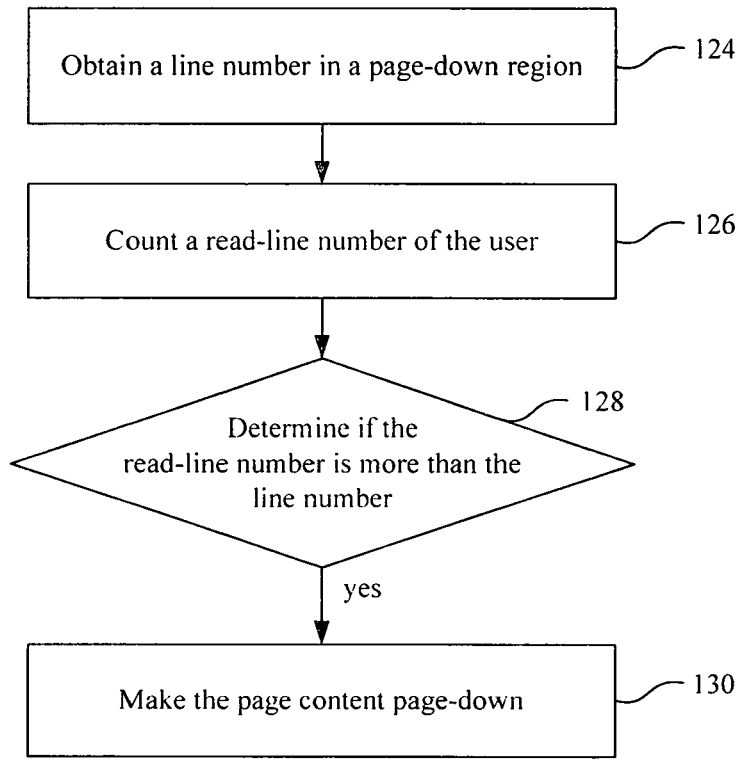
FIG. 10 is another flowchart of scrolling the page content according to the viewing angle of the user.

FIG. 10 is another flowchart for scrolling the page content according to the viewing angle of the user. Referring to FIG. 10, scrolling the page content according to the viewing angle may include the following steps:

(l) Obtain a line number in a page-down region of the page content (step 124).

(m) Count a read-line number of the user when the viewing angle of the user is less than a non-scrolling range (step 126).

(n) Determine if the read-line number is more than the line number (step 128).

(o) Make the page content page-down if the read-line number is more than the line number (step 130).

Figure 11:
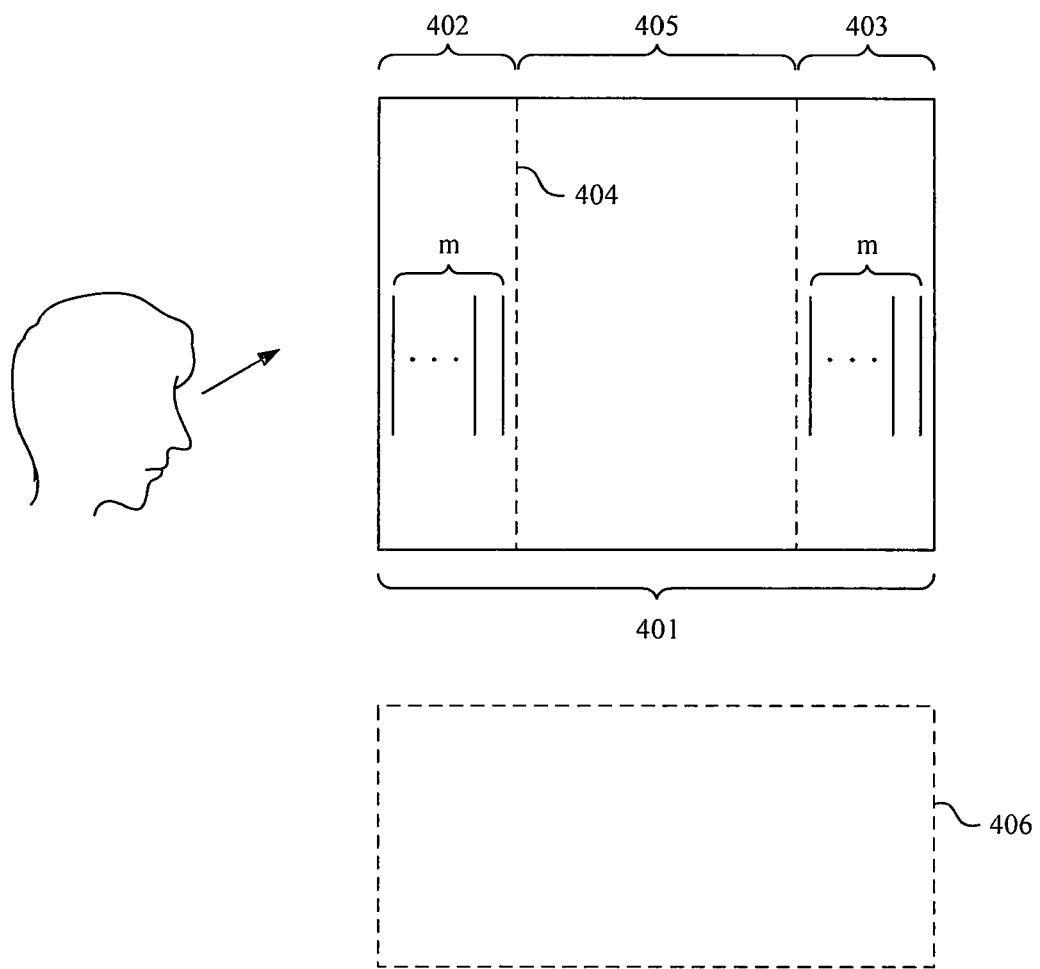
FIG. 11 illustrates another page content 401 displayed on a display element.

FIG. 11 illustrates another page content 401 displayed on a display element, wherein words on the page content 401 are vertical and the word sequence of the page content 401 is from right to left. For example, referring to FIG. 10 and FIG. 11, obtain a line number m in a page-down region 402 of the page content 401 (step 124). In detail, the line number m may be obtained according to font or any other display information on the page content 401. The viewing angle of the user may be less than the non-scrolling range when the sight of the user falls on the page-down region 402. Count the read-line number n of the user when the viewing angle of the user is less than the non-scrolling range (step 126). In other words, count the read-line number n of the user when the sight of the user falls at left of a left-most line 404 of a non-operation region 405 of the page content 401. In practice, the viewing angle includes a horizontal viewing angle and a vertical viewing angle. The vertical viewing angle is defined as a positive number when the user looks above the horizontal line, whereas the vertical viewing angle is defined as a negative number when the user looks below the horizontal line. When the user reads one line of vertical text, the vertical viewing angle of the user may go from a positive number to a negative number. Accordingly, the read-line number n of the user may be counted by the total times that the vertical viewing angle of the user goes from a positive number to a negative number. Then, make the page content 401 page-down if the read-line number n is more than the line number m (step 130). In other words, replace the page content 401 with the next page content 406 when the user reads more lines than the line number m, wherein the next page content 406 is virtually below the page content 401 and is not displayed on the display element. However, when the line sequence of the words on the page content 401 is from the left side to the right side, the page-down region 402 may be replaced with another page-down region 403 and the definition of the value of the viewing angle may differ. Besides, this embodiment can also be applied for a horizontal-text page content with some more amendments. Therefore, the display method can page down the page content according to the reading action of the user.

Figure 12:
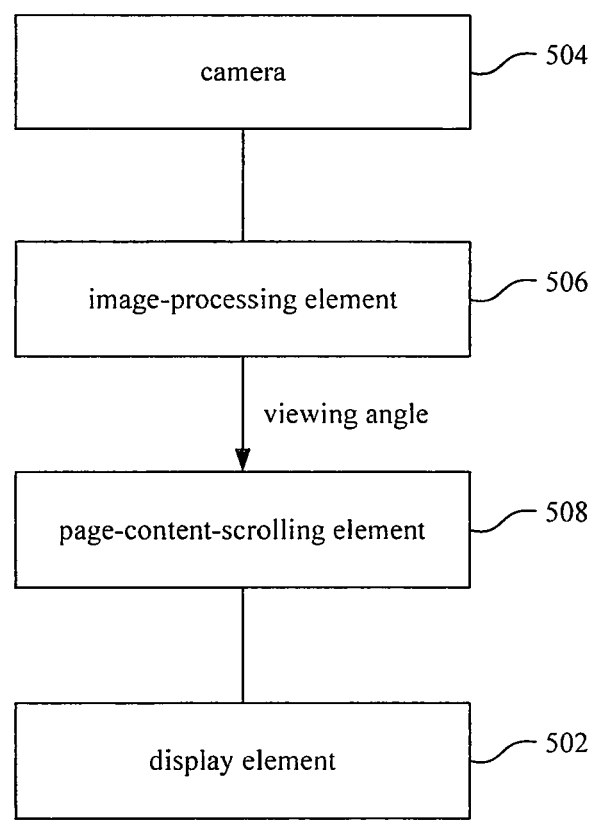
FIG. 12 is a block diagram of a display device according to another embodiment of this invention.

FIG. 12 is a block diagram of a display device according to another embodiment of this invention. The display device captures a facial feature of a user to scroll page content displayed by the display device. The display device includes a display element 502, a camera 504, an image-processing element 506 and a page-content-scrolling element 508. The display element 502 displays page content. The camera 504 captures a facial feature of a user to obtain an image. The facial feature of the user may be the pupil, the head, the nose, the mouth or any other facial feature of the user. The image-processing element 506 processes the image to obtain a viewing angle of the user. In detail, the image-processing element 506 may process the image to obtain a position of the facial feature of the user and obtain the viewing angle of the user according to the position of the facial feature of the user. The page-content-scrolling element 508 scrolls the page content according to the viewing angle of the user. Therefore, the display device can scroll the page content displayed by the display device according to the viewing angle of the user.

Figure 13:
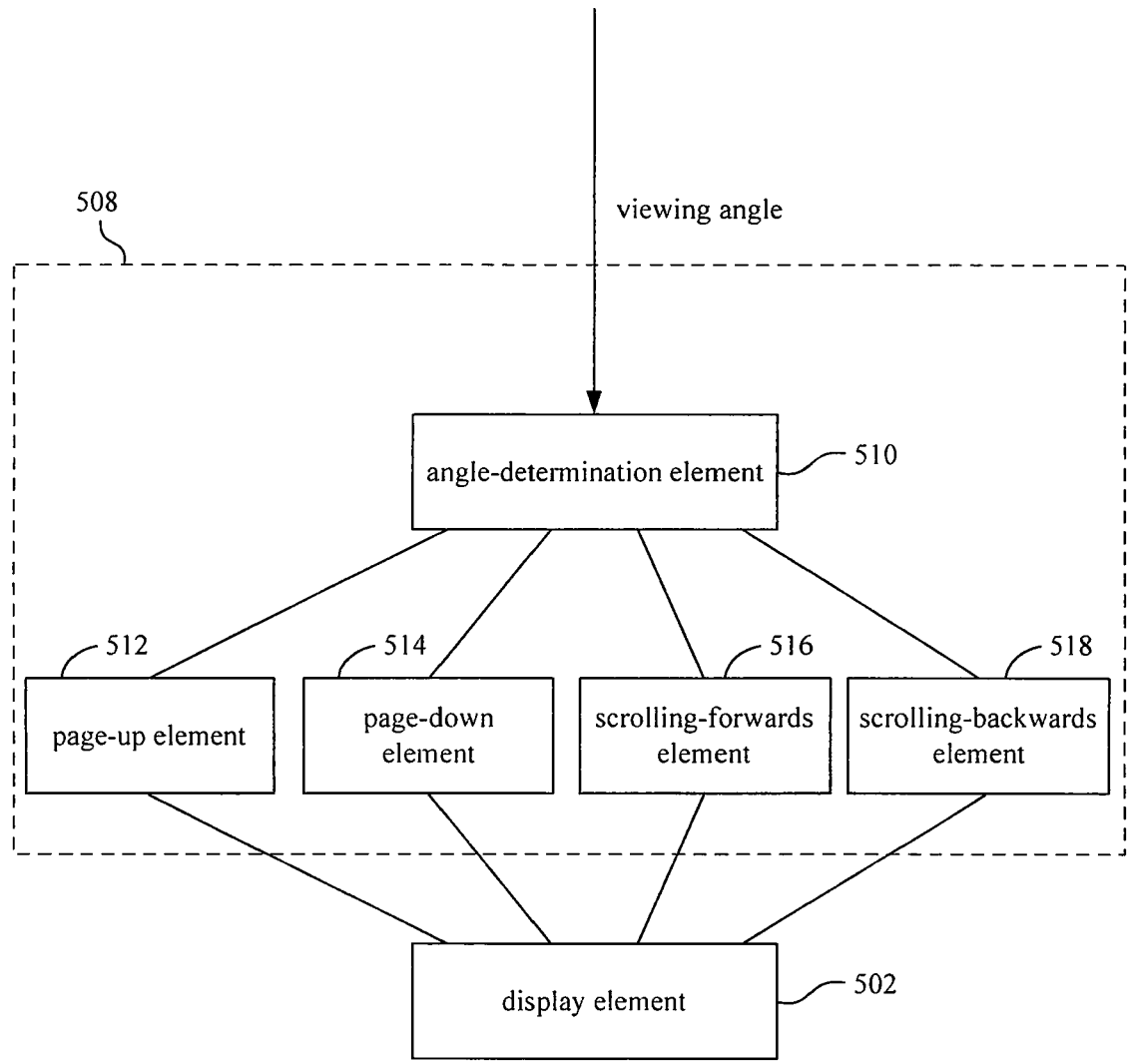
FIG. 13 is an embodiment of the page-content-scrolling element 508 in FIG. 12.

Furthermore, there may be several ways to implement the page-content-scrolling element 508. FIG. 13 is an embodiment of the page-content-scrolling element 508 in FIG. 12. The page-content-scrolling element 508 may include an angle-determination element 510 and a page-up element 512. The angle-determination element 510 determines if the viewing angle of the user stays in a page-up range for more than a page-up time. The page-up element 512 makes the page content page-up if the viewing angle of the user stays in the page-up range for more than the page-up time.

For example, refer to FIG. 4 and FIG. 13. The display element 502 displays the page content 201, wherein words on the page content 201 are horizontal. The angle-determination element 510 determines if the viewing angle of the user stays in a page-up range for more than a page-up time, wherein the sight of the user may fall on a page-up region 218 of the page 201 when the viewing angle of the user stays in the page-up range. In other words, the angle-determination element 510 may determine if the sight of the user falls on the page-up region 218 for more than the page-up time. Then, the page-up element 512 makes the page content 201 page-up if the viewing angle of the user stays in the page-up range for more than the page-up time. In other words, the page-up element 512 replaces the page content 201 with a previous page content 206 if the sight of the user falls on the page-up region 218 for more than the page-up time, wherein the previous page content 206 is virtually above the page content 201 and is not displayed on the display element 502. However, this embodiment can also be applied for a vertical-text page content with some amendments. Therefore, the display device can make the page content page-up according to the viewing angle of the user.

The page-content-scrolling element 508 may make the page content displayed by the display element 502 page-down according to the viewing angle of the user. Referring to FIG. 13, the page-content-scrolling element 508 may include a page-down element 514. The angle-determination element 510 may determine if the viewing angle of the user stays in a page-down range for more than a page-down time. The page-down element 514 makes the page content page-down if the viewing angle of the user stays in the page-down range for more than the page-down time.

For example, refer to FIG. 4 and FIG. 13. The angle-determination element 510 may determine if the viewing angle of the user stays in the page-down range for more than the page-down time, wherein the sight of the user may fall on a page-down region 220 of the page content 201 when the viewing angle of the user stays in the page-down range. In other words, the angle-determination element 510 determines if the sight of the user falls on the page-down region 220 for more than the page-down time. Then, the page-content-scrolling element 508 makes the page content 201 page-down if the viewing angle of the user stays in the page-down range for more than the page-down time. In other words, the page-content-scrolling element 508 replaces the page content 201 with a next page content 208 if the sight of the user falls on the page-down region 220 for more than the page-down time, wherein the next page content 208 is virtually below the page content 201 and is not displayed on the display element 502. However, this embodiment can also be applied for a vertical-text page content with some amendments. Therefore, the display device can make the page content page-down according to the viewing angle of the user.

The page-content-scrolling element 508 may make the page content displayed by the display element 502 scroll-forwards according to the viewing angle of the user. Refer to FIG. 13. The page-content-scrolling element 508 may include a scrolling-forwards element 516. The angle-determination element 510 determines if the viewing angle of the user is more than a non-scrolling range. The scrolling-forwards element 516 scrolls the page-content forwards if the viewing angle of the user is more than the non-scrolling range.

For example, refer to FIG. 4 and FIG. 13. The angle-determination element 510 determines if the viewing angle of the user is more than the non-scrolling range. When the viewing angle of the user is more than the non-scrolling range, the sight of the user may fall above an upper line 217 of a non-operation region 203 of the page content 201. In other words, the angle-determination element 510 determines if the sight of the user falls above the upper line 217. The page-content-scrolling element 508 scrolls the page content 201 forwards (in the direction 214) on the display element 502 if the viewing angle of the user is more than the non-scrolling range. In other words, the page-content-scrolling element 508 scrolls the page content 201 forwards (in the direction 214) once the sight of the user falls above the upper line 217. However, this embodiment can also be applied for a vertical-text page content with some amendments. Therefore, the display device can make the page content scroll-forwards according to the viewing angle of the user.

The page-content-scrolling element 508 may make the page content displayed by the display element 502 scroll-backwards according to the viewing angle of the user. Referring to FIG. 13, the page-content-scrolling element 508 may include a scrolling-backwards element 518. The angle-determination element 510 determines if the viewing angle of the user is less than a non-scrolling range. The scrolling-backwards element 518 scrolls backwards the page content if the viewing angle of the user is less than the non-scrolling range.

For example, refer to FIG. 4 and FIG. 13. The angle-determination element 510 determines if the viewing angle of the user is less than the non-scrolling range. When the viewing angle of the user is less than the non-scrolling range, the sight of the user may fall below a lower line 215 of the non-operation region 203 of the page content 201. In other words, the angle-determination element 510 determines if the sight of the user falls below the lower line 215. The scrolling-backwards element 518 scrolls the page content 201 backwards (in the direction 216) on the display element 502 if the viewing angle of the user is less than the non-scrolling range. In other words, the scrolling-backwards element 518 scrolls the page content 201 backwards (in the direction 216) once the sight of the user falls below the lower line 215. However, this embodiment can also be applied for a vertical-text page content with some amendments. Therefore, the display device can make the page content scroll-backwards according to the viewing angle of the user.

Figure 14:
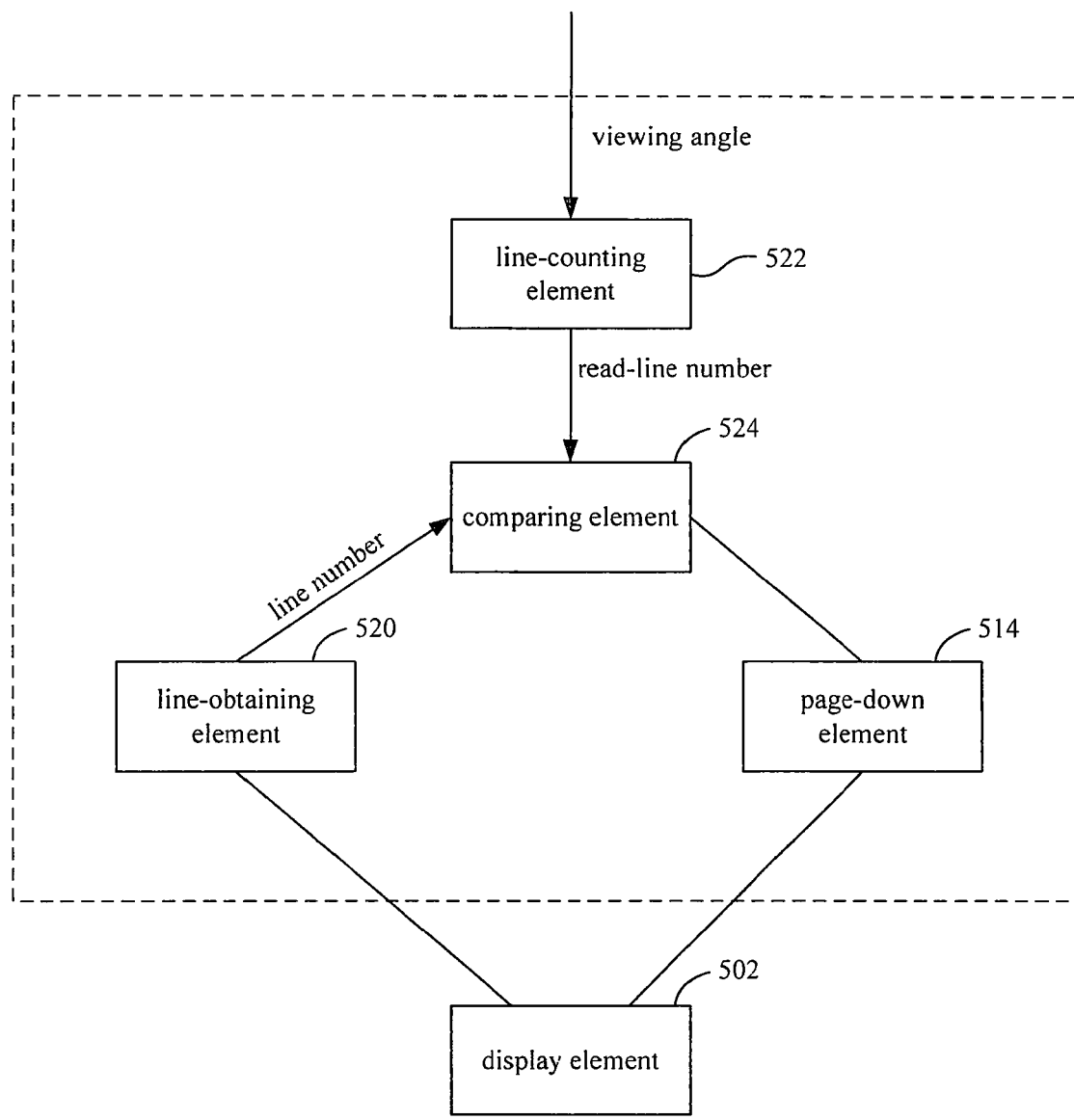
FIG. 14 is another embodiment of the page-content-scrolling element 508 in FIG. 12.

FIG. 14 is another embodiment of the page-content-scrolling element 508 in FIG. 12. The page-content-scrolling element 508 may make the page content displayed by the display element 502 page-down according to the action of the user. The page-content-scrolling element 508 may include a line-obtaining element 520, a line-counting element 522, a comparing element 524 and a page-down element 514. The line-obtaining element 520 obtains a line number in a page-down region of the page content. The line-counting element 522 counts a read-line number of the user when the viewing angle of the user is less than a non-scrolling range. The comparing element 524 compares the line number and the read-line number. The page-down element 514 makes the page content page-down if the read-line number is more than the line number. For example, referring to FIG. 11 and FIG. 14, the line-obtaining element 520 obtains a line number m in a page-down region 402 of page content 401, wherein the page content 401 is displayed by the display element 502. In detail, the line number m may be obtained according to the DPI (Dots Per Inch) setting of the display element 502, the setting of display scale, font or any other display information on the page content 401. The viewing angle of the user may be less than the non-scrolling range when the sight of the user falls on the page-down region 402. The line-counting element 522 counts a read-line number n of the user when the viewing angle of the user is less than the non-scrolling range. In other words, the line-counting element 522 counts the read-line number n of the user when the sight of the user falls at left of a left-most line 404 of a non-operation region 405 of the page content 401. In practice, the viewing angle includes a horizontal viewing angle and a vertical viewing angle. The vertical viewing angle is defined as a positive number when the user looks above the horizontal line, whereas the vertical viewing angle is defined as a negative number when the user looks below the horizontal line. When the user reads one line of vertical text, the vertical viewing angle of the user may go from a positive number to a negative number. Accordingly, the line-counting element 522 may count the read-line number n of the user by the total times that the vertical viewing angle of the user goes from a positive number to a negative number. The comparing element 524 compares the line number m and the read-line number n. The page-down element 514 replaces the page content 401 with the next page content 406 if the read-line number m is more than the line number n. In other words, the page-down element 514 makes the page content 401 page-down if the user reads more lines than the line number n, wherein the next page content 406 is virtually below the page content 401 and is not displayed on the display element 502. However, when the line sequence of the words on the page content 401 is from the left side to the right side, the page-down region 402 may be replaced with another page-down region 403 and the definition of the value of the viewing angle may differ. Besides, this embodiment can also be applied for a horizontal-text page content with some amendments. Therefore, the display device can make the page content page-down according to the reading action of the user.

Figure 15:
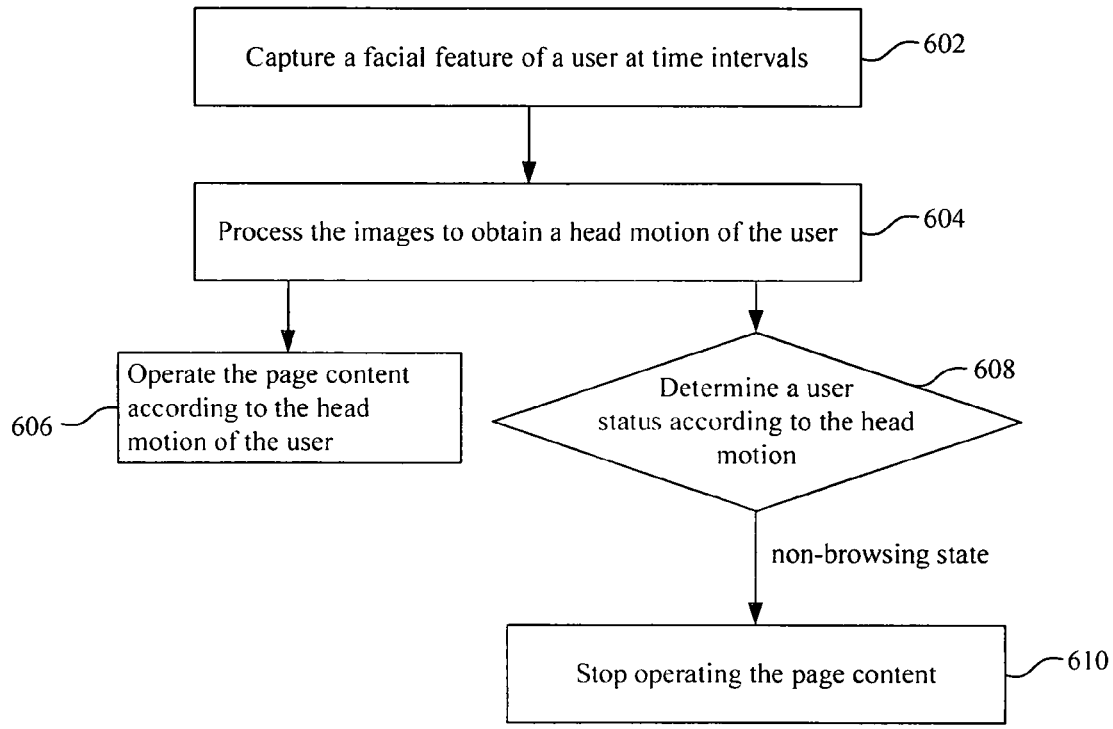
FIG. 15 illustrates a flowchart of a display method 600 according to another embodiment of this invention.

FIG. 15 illustrates a flowchart of a display method 600 according to another embodiment of this invention. The display method 600 operates page content displayed by a display element according to a head motion of a user. The display method 600 includes the following steps:

(a) Capture a facial feature of a user at time intervals to obtain several images (step 602).

(b) Process the images to obtain a head motion of the user (step 604).

(c) Operate the page content according to the head motion of the user (step 606).

For example, capture a facial feature of a user to obtain an image at the time t1 and t2 respectively (step 602). Process the images obtained at the time t1 and t2 to obtain a head motion of the user (step 604). Operate the page content according to the head motion of the user (step 606), wherein the operation to the page content may be scroll-forwards, scroll-backwards, page-up, page-down or any other operation to the page content. However, more images can be captured at more than two different time respectively to obtain the head motion of the user. Therefore, the display method can operate the page content displayed by a display element according to the head motion of the user.

Furthermore, the user may not always browse the page content. Therefore, the display method 600 may include the following steps:

(d) Determine a user status according to the head motion of the user (step 608).

(e) Stop operating the page content if the user status is in a non-browsing state (step 610).

The user status may be in a browsing state or non-browsing state. When the user status is in the browsing state, the user is browsing the page content. When the user status is in the non-browsing state, the user is not browsing the page content. For example, the user may be doing some head-exercises or dozing off when the user status is in the non-browsing state. Accordingly, stop operating the page content if the user status is in the non-browsing state (step 610). Therefore, the display method can stop operating the page content when the user is not browsing the page content.

Figure 16:
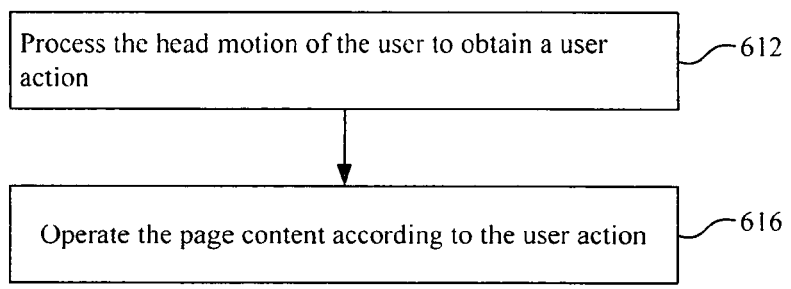
FIG. 16 is a flowchart of operating the page-content according to the head motion of the user.

FIG. 16 is a flowchart of operating the page content according to the head motion of the user. The steps of operating the page content according to the head motion of the user may include the following steps:

(f) Process the head motion of the user to obtain a user action (step 612).

(g) Operate the page content according to the user action (step 616).

Figure 17A:
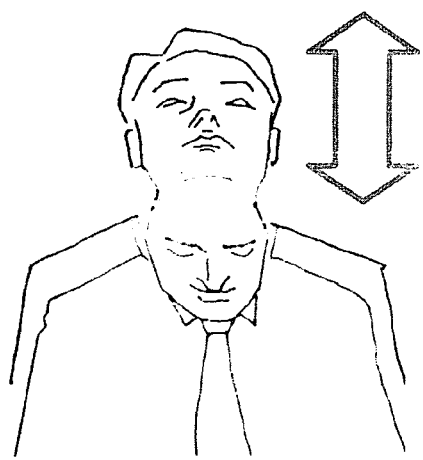
FIG. 17A, FIG. 17B, FIG. 17C and FIG. 17D illustrate user actions.
Figure 17B:
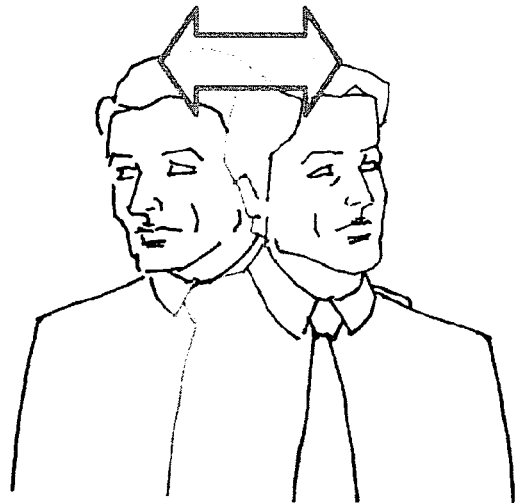
Figure 17C:
Figure 17D:

For example, the user action may be nod (as shown in FIG. 17A), raise-head, shake-head (as shown in FIG. 17B), twist-neck (as shown in FIG. 17C) and stretch-head (as shown in FIG. 17D). Each user action may correspond to an operating instruction of an instruction set or a database. Accordingly, operate the page content by the operating instruction corresponding to the obtained user action (step 616). Furthermore, operating instructions in the instruction set or the database may be modified or added to correspond to different user actions. There may be some environment variables (such as an environment brightness variable) or facial feature variables to modify the operating instructions for different environment or different users. Therefore, the display method can operate the page content displayed by a display element according to the head motion of the user.

Figure 18:
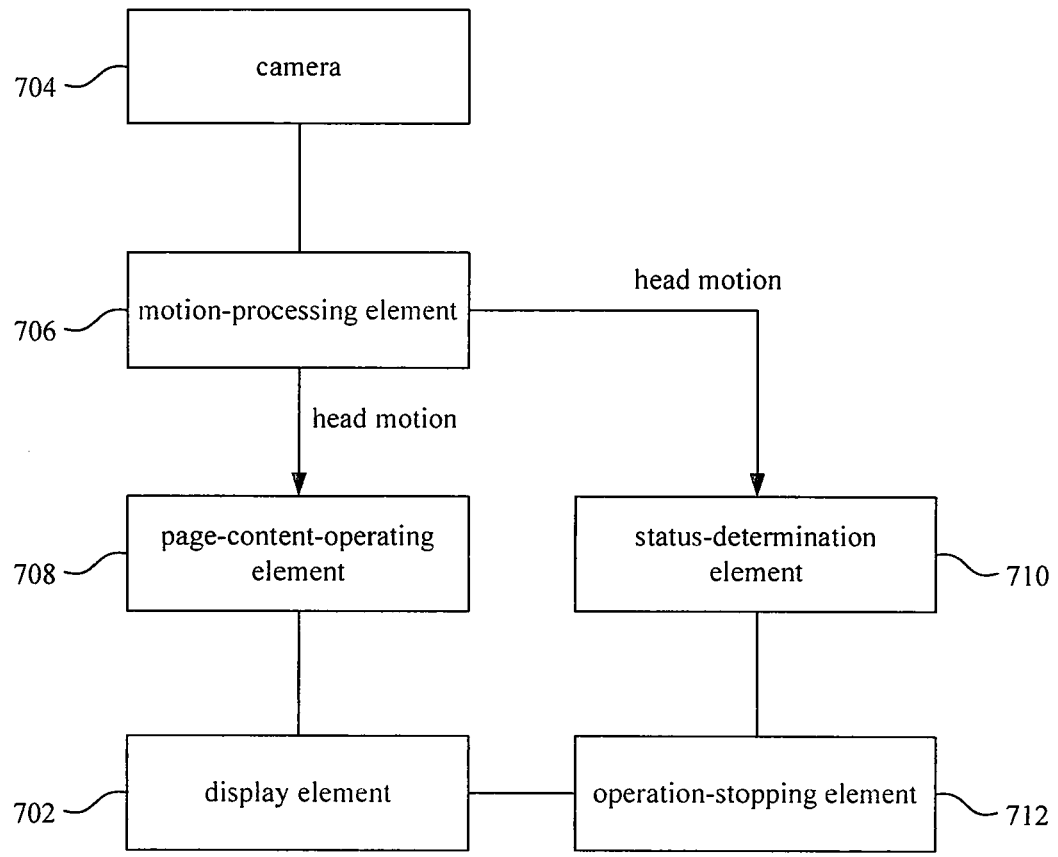
FIG. 18 is a block diagram of a display device according to another embodiment of this invention.

FIG. 18 is a block diagram of a display device according to another embodiment of this invention. The display device captures a facial feature of a user at different time respectively to operate page content displayed by the display device. The display device includes a display element 702, a camera 704, a motion-processing element 706 and a page-content-operating element 708. The display element 702 displays page content. The camera 704 captures a facial feature of a user at time intervals to obtain plural images. The motion-processing element 706 processes the images to obtain a head motion of the user. The page-content-operating element 708 operates the page content according to the head motion of the user. Therefore, the display device can operate the page content Furthermore, the user may not always browse the page content on the display element 702. Therefore, the display device may include a status-judging element 710 and an operation-stopping element 712. The status-judging element 710 judges a user status according to the head motion, wherein the user status may be in a browsing state or a non-browsing state. When the user status is in a browsing state, the user is browsing the page content. When the user status is in a non-browsing state, the user is not browsing the page content. For example, the user may be doing some head-exercises or dozing off when the user status is in the non-browsing state. The operation-stopping element 712 stops operating the page content when the user status is in the non-browsing state. Therefore, the display device can stop operating the page content when the user is not browsing the page content.

Figure 19:
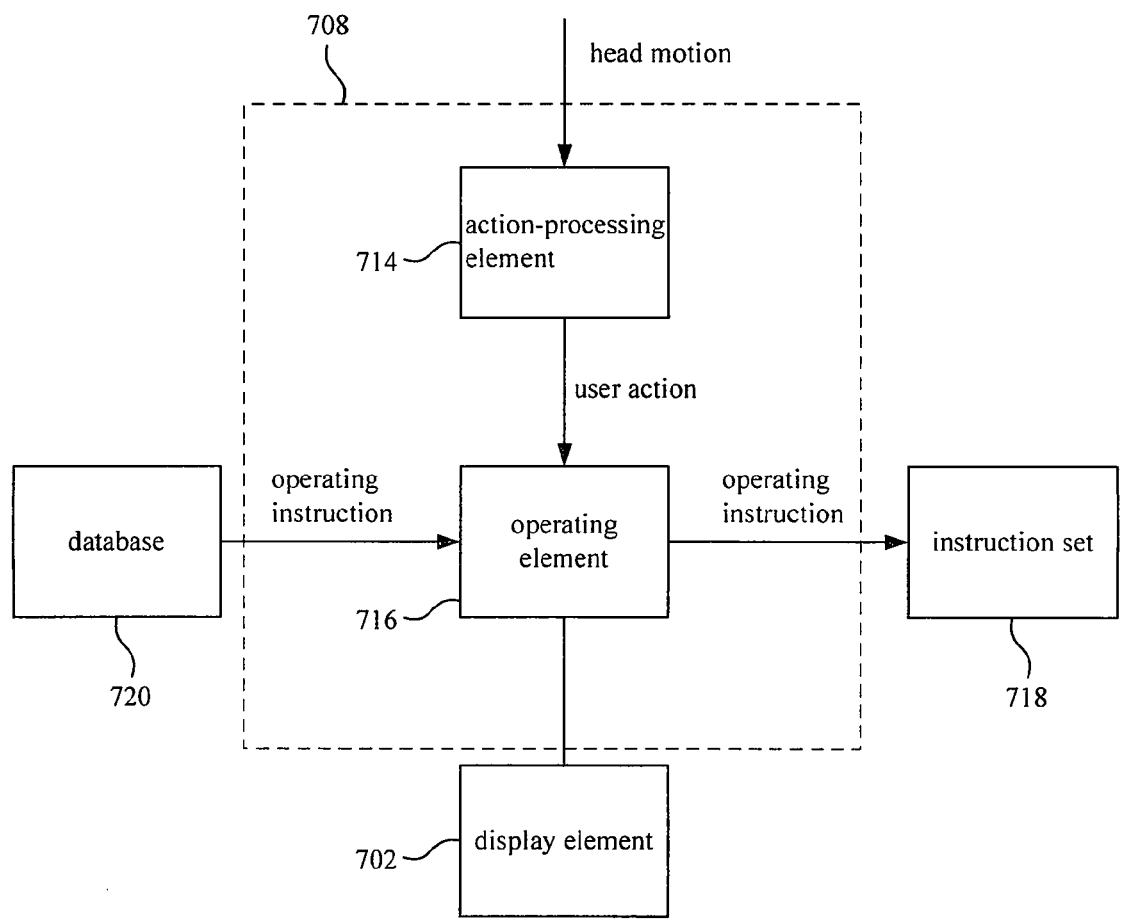
FIG. 19 is a page-content-operating element 708 in FIG. 18.

FIG. 19 is a page-content-operating element 708 in FIG. 18. The page-content-operating element 708 includes an action-processing element 714 and an operating element 716. The action-processing element 714 processes the head motion to obtain a user action. For example, the user action may be nod (as shown in FIG. 17A), raise-head, shake-head (as shown in FIG. 17B), twist-neck (as shown in FIG. 17C) and stretch-head (as shown in FIG. 17D). The operating element 716 operates the page content according to the user action. In detail, each user action may correspond to an operating instruction of an instruction set 718 or a database 720. Accordingly, the operating element 716 obtains operating instructions from the instruction set 718 or the database 720 according to the user action and operates the page content by the operating instruction. Furthermore, operating instructions in the instruction set 718 or the database 720 may be modified or added to correspond to different user actions. There may be some environment variables (such as an environment brightness variable) or facial feature variables to modify the operating instructions for different environment or different users. Therefore, the display device can operate the page content displayed by a display element according to the head motion of the user.

Although the present invention has been described in considerable detail with reference to certain embodiments thereof, other embodiments are possible. Therefore, their spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display method comprising:
   (a) capturing a facial feature of a user to obtain an image;
   (b) processing the image to obtain a viewing angle of the user; and
   (c) scrolling page content displayed by a display element according to the viewing angle of the user, wherein the step (c) comprises:
   (l) obtaining a line number in a page-down region of the page content, wherein the viewing angle of the user is less than a non-scrolling range when sight of the user falls on the page-down region;

(m) counting a read-line number read by the user when the viewing angle of the user is less than the non-scrolling range;

(n) determining if the read-line number is more than the line number; and (o) making the page content page-down when the read-line number is more than the line number.

2. The display method of claim 1, wherein the step (c) further comprises:

(d) determining if the viewing angle of the user stays in a page-up range for more than a page-up time; and (e) making the page content page-up when the viewing angle of the user stays in the page-up range for more than the page-up time.

3. The display method of claim 1, wherein the step (c) further comprises:

(f) determining if the viewing angle of the user stays in a page-down range for more than a page-down time; and (g) making the page content page-down when the viewing angle of the user stays in the page-down range for more than the page-down time.

4. The display method of claim 1, wherein the step (c) further comprises:

(h) determining if the viewing angle of the user is more than a non-scrolling range; and (i) scrolling forwards the page content when the viewing angle of the user is more than the non-scrolling range.

5. The display method of claim 1, wherein the step (c) further comprises:

(j) determining if the viewing angle of the user is less than a non-scrolling range; and (k) scrolling backwards the page content when the viewing angle of the user is less than the non-scrolling range.

6. A display device comprising:

a display element for displaying page content;

a camera for capturing a facial feature of a user to obtain an image;

an image-processing element for processing the image to obtain a viewing angle of the user; and a page-content-scrolling element for scrolling the page content according to the viewing angle of the user, wherein the page-content-scrolling element comprises:

a line-obtaining element for obtaining a line number in a page-down region of the page content, wherein the viewing angle of the user is less than a non-scrolling range when sight of the user falls on the page-down region;

a line-counting element for counting a read-line number read by the user when the viewing angle of the user is less than the non-scrolling range;

a comparing element for comparing the line number and the read-line number; and a page-down element for making the page content page-down when the read-line number is more than the line number.

7. The display device of claim 6, wherein the page-content-scrolling element further comprises:

an angle-determination element for determining if the viewing angle of the user stays in a page-up range for more than a page-up time; and a page-up element for making the page content page-up when the viewing angle of the user stays in the page-up range for more than the page-up time.

8. The display device of claim 6, wherein the page-content-scrolling element further comprises:

an angle-determination element for determining if the viewing angle of the user stays in a page-down range for more than a page-down time; and a page-down element for making the page content page-down when the viewing angle of the user stays in the page-down range for more than the page-down time.

9. The display device of claim 6, wherein the page-content-scrolling element further comprises:

an angle-determination element for determining if the viewing angle of the user is more than a non-scrolling range; and a scrolling-forwards element for scrolling the page content forwards when the viewing angle of the user is more than the non-scrolling range.

10. The display device of claim 6, wherein the page-content-scrolling element further comprises:

an angle-determination element for determining if the viewing angle of the user is less than a non-scrolling range; and a scrolling-backwards element for scrolling the page content backwards when the viewing angle of the user is less than the non-scrolling range.

* * * * *